(12) United States Patent
Shimizu et al.

(10) Patent No.: US 7,465,215 B2
(45) Date of Patent: Dec. 16, 2008

(54) SPONGE BLASTING APPARATUS AND SPONGE BLASTING METHOD

(75) Inventors: Tokuo Shimizu, Tokyo (JP); Atsushi Maeda, Tokyo (JP); Takashi Kitahara, Tokyo (JP); Tetsunori Yano, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 0 days.

(21) Appl. No.: 11/687,700

(22) Filed: Mar. 19, 2007

(65) Prior Publication Data

US 2007/0218808 A1 Sep. 20, 2007

(30) Foreign Application Priority Data

Mar. 17, 2006 (JP) ............... 2006-074270

(51) Int. Cl.
*B24B 49/00* (2006.01)
*B24B 51/00* (2006.01)
*B24B 1/00* (2006.01)
*B24C 3/00* (2006.01)
*B24B 7/00* (2006.01)

(52) U.S. Cl. ................ 451/5; 451/38; 451/75
(58) Field of Classification Search ............... 451/5, 451/38, 75, 87–91, 97–100
See application file for complete search history.

(56) References Cited

U.S. PATENT DOCUMENTS

| | | | | |
|---|---|---|---|---|
| 3,073,070 A | * | 1/1963 | Mead ............... | 451/2 |
| 3,461,478 A | * | 8/1969 | Taylor ............. | 15/302 |
| 5,269,424 A | * | 12/1993 | Lyras ............... | 209/2 |
| 5,325,638 A | * | 7/1994 | Lynn ............... | 451/39 |
| 5,795,626 A | * | 8/1998 | Gabel et al. ....... | 427/458 |
| 5,839,951 A | * | 11/1998 | Tomioka ........... | 451/446 |
| 6,059,641 A | * | 5/2000 | Okamoto .......... | 451/99 |
| 6,190,235 B1 | * | 2/2001 | Csabai et al. ...... | 451/36 |
| 7,052,362 B2 | * | 5/2006 | Lynn ............... | 451/3 |
| 2003/0064668 A1 | * | 4/2003 | Mrak ............... | 451/88 |

FOREIGN PATENT DOCUMENTS

| | | |
|---|---|---|
| EP | 1 754 572 A1 | 2/2007 |
| GB | 2 367 777 A | 4/2002 |
| JP | 9-109029 A | 4/1997 |
| JP | 2006-123152 A | 5/2006 |

* cited by examiner

*Primary Examiner*—Joseph J. Hail, III
*Assistant Examiner*—Alvin J Grant
(74) *Attorney, Agent, or Firm*—David S. Safran; Roberts Mlotkowski Safran & Cole, P.C.

(57) ABSTRACT

The present invention provides a sponge blasting apparatus comprising: a recovering unit which sucks and recovers a blasting medium jetted out of a nozzle; a sorting unit which sorts the blasting medium sucked and recovered by the recovering unit into a reusable blasting medium and an unreusable blasting medium; a blower which gives a sucking force to the recovering unit via the sorting unit; a dust collector which removes dust from an exhaust air discharged from the sorting unit with a sucking force of the blower; a picking-apart unit which picks apart the reusable blasting medium sorted by the sorting unit; a continuous feeder which, having at least two reservoir tanks into which the reusable blasting medium picked apart by the picking-apart unit is inputted, changes over the two tanks between each other to continuously feed the nozzle with the blasting medium deposited in the tanks; and a carrier which carries to the continuous feeder the reusable blasting medium sorted by the sorting unit.

6 Claims, 9 Drawing Sheets

SPONGE BLASTING APPARATUS AND SPONGE BLASTING METHOD

BACKGROUND OF THE INVENTION

1. Field of the Invention

The present invention relates to a sponge blasting apparatus which jets against a work a blasting medium of sponge fragments formed of abrasives stuck within a porous elastic body, and thereby roughens the surface of the work to prepare it for further machining, and a sponge blasting method.

2. Description of the Related Art

When a painted wall surface is to be repainted, blasting is carried out as a preparatory step to grind the coat of the wall surface, roughen the coated surface and thereby to make it ready to be repainted.

Such blasting has been traditionally accomplished by using sand as the blasting medium as described in Japanese Patent Application Laid-Open No. 9-109029 and elsewhere. Sand blasting is a process by which a sand-containing air jet blown out of a nozzle at high speed is caused to hit against the painted surface, and the painted coat of the surface is ground off with the impact of the blast to roughen the surface.

However, since the blasting medium bounce off with a strong force in a sand blasting process, it entails a problem of the scattering of fine dust. Moreover, the operator who manipulates the nozzle has to wear heavy clothes to protect oneself against the blasting medium bouncing off with a strong force, and accordingly cannot move flexibly. Furthermore, since the operator's field of view is blurred by the scattering dust, it is difficult for him to accomplish his task in uniform quality.

With a view to solving these problems, the so-called sponge blasting came to be known, which uses as the blasting medium sponge fragments formed of abrasives stuck within a porous elastic body.

By this sponge blasting, when the sponge blasting medium blown out of a nozzle with a high speed air jet is caused to hit against the painted surface, the blasting medium becomes flat and the contained abrasives directly hit the painted surface at high speed. In this way, the painted coat can be ground and removed as in sand blasting. There also is an advantage that fine dust, which would otherwise drift in the air, is sucked into the sponge fragments, and accordingly the dust scattering can be reduced. Sponge blasting has a further advantage that, as the repulsive force is also absorbed by the sponge fragments, the bouncing off of the blasting medium is dramatically reduced, and accordingly the operator who manipulates the nozzle need not wear so heavy protective clothing.

SUMMARY OF THE INVENTION

Incidentally, since a sponge blasting medium can be reused a number of times, it is desired to recover the jetted sponge blasting medium, select its reusable portions and reuse them. So far, however, there has been proposed no sponge blasting apparatus which allows a sponge blasting medium to be efficiently recovered, sorted and reused.

Nor there is any method of qualitatively evaluating the remaining functional life of the blasting medium used in sponge blasting. As a consequence, the user of the medium cannot be assured of the remaining effective life of the blasting medium, and the user may discard a reusable blasting medium unknowingly, or reuse a blasting medium no longer reusable and suffer a drop in working efficiency.

An object of the present invention, attempted in view of these circumstances, is to provide a sponge blasting apparatus and a sponge blasting method which enable a blasting medium to be efficiently recovered, sorted and reused and make it possible to automatically assess the remaining functional life of the blasting medium.

In order to achieve the object stated above, according to a first aspect of the invention, there is provided a sponge blasting apparatus which jets against a work a blasting medium of a sponge fragment formed of abrasives stuck within a porous elastic body out of a nozzle and grinds the work, comprising a recovering unit which sucks and recovers the blasting medium jetted out of the nozzle; a sorting unit which sorts the blasting medium sucked and recovered by the recovering unit into a reusable blasting medium and an unreusable blasting medium; a blower which gives a sucking force to the recovering unit via the sorting unit; a dust collector which removes dust from the exhaust air discharged from the sorting unit with the sucking force of the blower; a picking-apart unit which picks apart the reusable blasting medium sorted by the sorting unit; a continuous feeder which, having at least two reservoir tanks into which the reusable blasting medium picked apart by the picking-apart unit is inputted, changes over the two tanks between each other to continuously feed the nozzle with the blasting medium deposited in the tanks; and a carrier which carries to the continuous feeder the reusable blasting medium sorted by the sorting unit.

According to a first aspect of the invention, the recovering unit, the sorting unit, the dust collector and the blower are linked in series; namely, the sucking force of the blower is transmitted to the recovering unit from the dust collector via the sorting unit, and the recovering unit recovers the blasting medium with that sucking force. This blasting medium recovered by the recovering unit is sorted into a reusable blasting medium and an unreusable blasting medium by the sorting unit. And the reusable blasting medium is taken out of the sorting unit and carried to the continuous feeder with, for instance, compressed air of the carrier. This continuous feeder has at least two reservoir tanks into which the reusable blasting medium is inputted; while the blasting medium stored in the first tank is being fed to the nozzle, the reusable blasting medium is carried to the second tank and, when the first tank becomes empty, the blasting medium stored in the second tank is fed to the nozzle. In this way, the reusable blasting medium can be continuously fed to the nozzle.

Meanwhile, the exhaust air discharged from the sorting unit with the sucking force of the blower is cleared of the fine dust of the blasting medium and other kinds of dust contained in the exhaust air by passing the dust collector and discharged into the atmosphere. Therefore, the working environment is significantly improved.

Further according to the invention, part of the blasting medium picked apart by the picking-apart unit is taken out, the particle size of the abrasives, the unit volume and mass of the blasting medium or the projection area of the blasting medium are measured, and blast operation is stopped before a certain level is reached.

Also by using the sponge blasting apparatus according to the first aspect of the invention, it is preferable to acquire for each type of blasting medium the optimal data of the pressures in the reservoir tanks of the continuous feeder when a fixed quantity of the blasting medium is jetted out of the nozzle, the suction pressure at the time of sucking and recovering the blasting medium by the blower, the negative pressure in the sorting unit, and the air pressure and flow rate of the blower, and automatically select the setpoints of the pressure and flow rate in each unit to exercise such control that optimal operation is achieved with the inputting of minimal conditions at the time of blasting with the blasting medium.

Further according to the invention, the picking-apart unit is provided with rotary vanes which pick apart by being rotated the reusable blasting medium having solidified into a lump state; a heater which heats the reusable blasting medium having solidified into a lump state in a hopper-shaped reservoir disposed upstream from the rotary vanes; and a controller which drives the heater when the rotary torque of the rotary vanes reaches or surpasses a certain level.

Also according to the invention, there is provided a sponge blasting apparatus further provided with a particle size measuring unit which measures the particle size of the blasting medium picked apart by the picking-apart unit; and a controller which prepares a particle size distribution on the basis of particle sizes measured by the particle size measuring unit, wherein the controller compares a threshold for judging whether a blasting medium is reusable or unreusable with the peak level of the particle size distribution prepared and, when the peak level surpasses the threshold, causes a display unit to display the usable limit of the medium.

The sponge blasting apparatus and the sponge blasting method according to the invention enable a blasting medium to be efficiently recovered, sorted and reused and make it possible to automatically assess the remaining functional life of the blasting medium.

DETAILED DESCRIPTION OF THE PREFERRED EMBODIMENTS

A sponge blasting apparatus and a sponge blasting method, which are preferred embodiments of the present invention, will be described in detail below with reference to the accompanying drawings.

Figure 1:
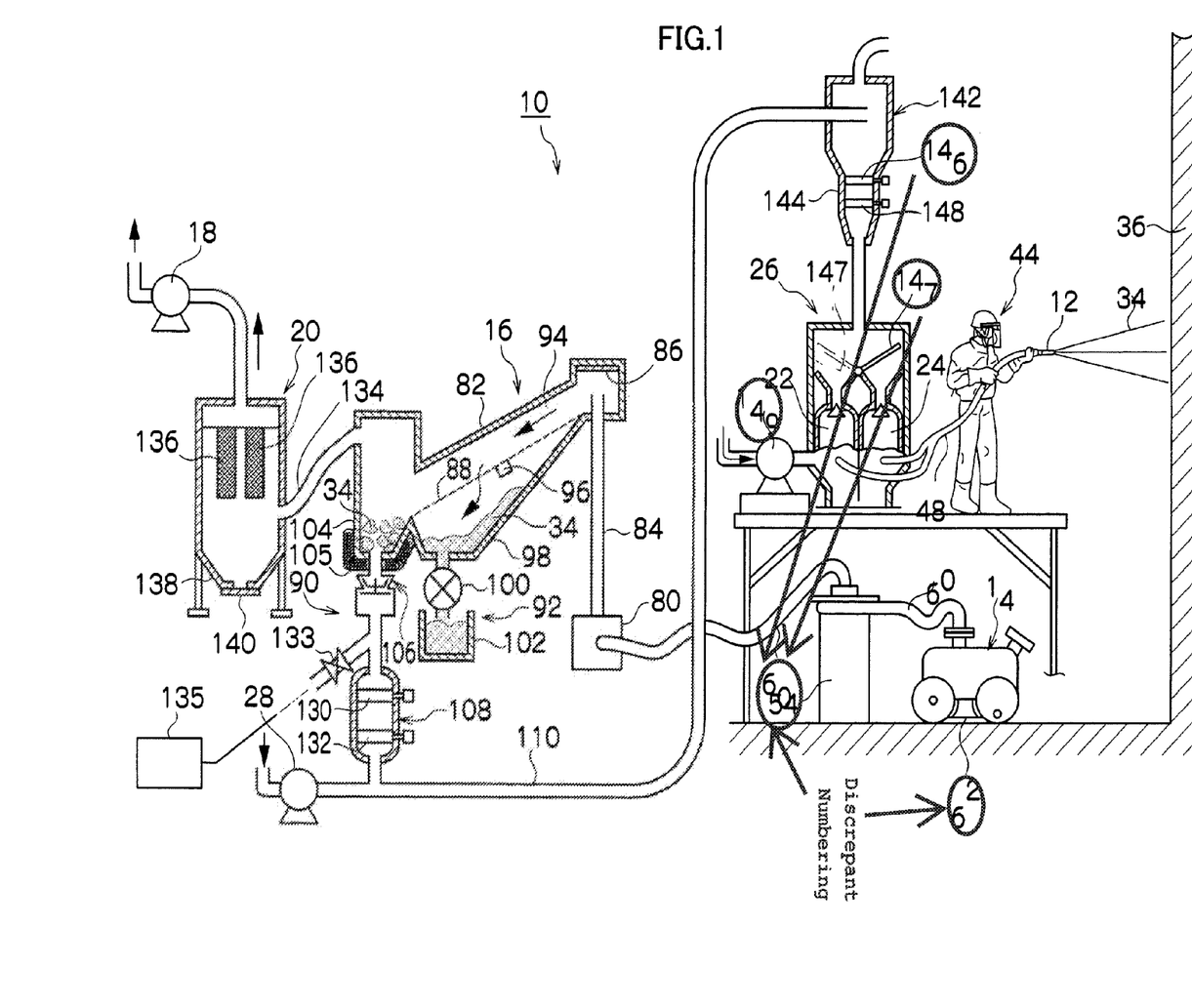
FIG. 1 shows an overall configuration of a sponge blasting apparatus.

FIG. 1 shows an overall configuration of a sponge blasting apparatus 10, which is an embodiment of the invention.

This sponge blasting apparatus 10 is provided with a nozzle 12 for jetting blasting medium in a sponge fragment form; a self-propelled recovering device 14 (recovering unit) for sucking and recovering the blasting medium jetted out of the nozzle 12; a solid-gas separating tank (sorting unit) 16 for sorting the blasting medium sucked and recovered by the self-propelled recovering device 14 into a reusable blasting medium and an unreusable blasting medium; a blower 18 for giving a sucking force to the self-propelled recovering device 14 via the solid-gas separating tank 16; a bag filter (dust collector) 20 for removing with the sucking force of the blower 18 dust from the exhaust air discharged from the solid-gas separating tank 16; a continuous feeding device (continuous feeder) 26 which, having at least two reservoir tanks 22 and 24 into which the reusable blasting medium sorted by the solid-gas separating tank 16 is inputted, changes over the two tanks 22 and 24 between each other to continuously feed the nozzle 12 with the blasting medium deposited in the tanks 22 and 24; and a blower (carrier) 28 for pneumatically feeding the continuous feeding device 26 with the reusable blasting medium sorted by the solid-gas separating tank 16 among other elements.

First, a sponge blasting method using the sponge blasting apparatus 10 will be described.

Figure 2A:
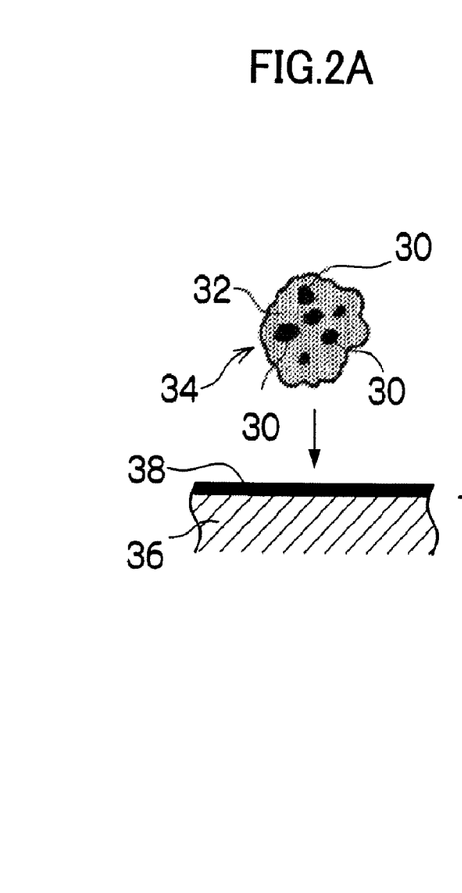
FIGS. 2A to 2C illustrate the mechanism of sponge blasting.
Figure 2B:
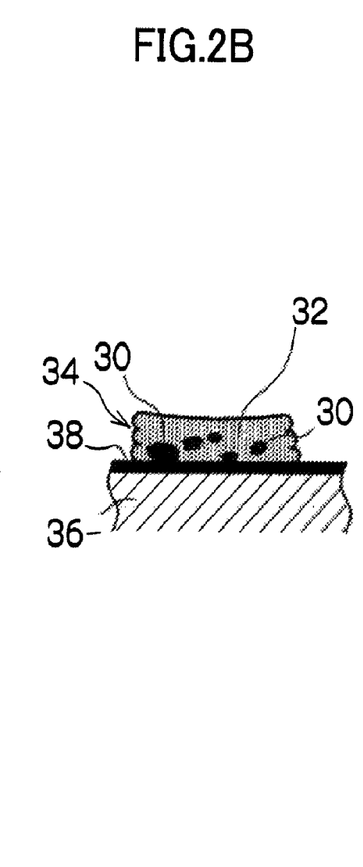
Figure 2C:
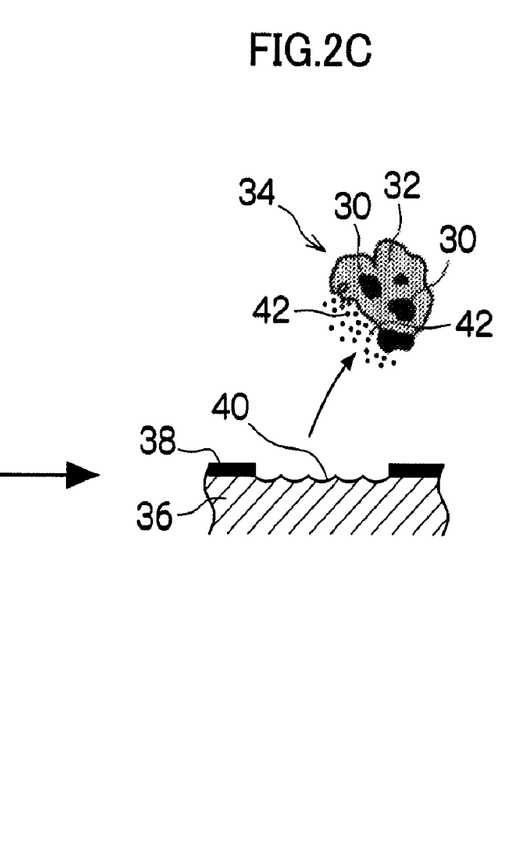

The blasting medium used by this method is formed of abrasives 30 of a material differing with the purpose as shown in FIGS. 2A to 2C (such as steel grits, alumina, starlight or urea resin) stuck to sponge fragments 32, and this blasting medium 34 is jetted against the coat 38 of a work 36 with high pressure air to grind off the coat 38 and roughen the painted surface 40 in preparation for further machining.

By this sponge blasting method, when the blasting medium 34 reaches the coat 38 as shown in FIG. 2A, the blasting medium 34 is flattened as shown in FIG. 2B, and the stuck abrasives 30, 30 . . . directly hit against the coat 38 at high speed. This causes, as in sand blasting, the coat 38 to be ground off as shown in FIG. 2C. Also, as fine dust particulates 42, 42 . . . , which would otherwise drift in the air, would be taken into the sponge fragments 32 and drop as they are, dust scattering can be reduced. As the repulsive force is also absorbed by the sponge fragments 32, the bouncing off of the blasting medium 34 is dramatically reduced.

Figure 3:
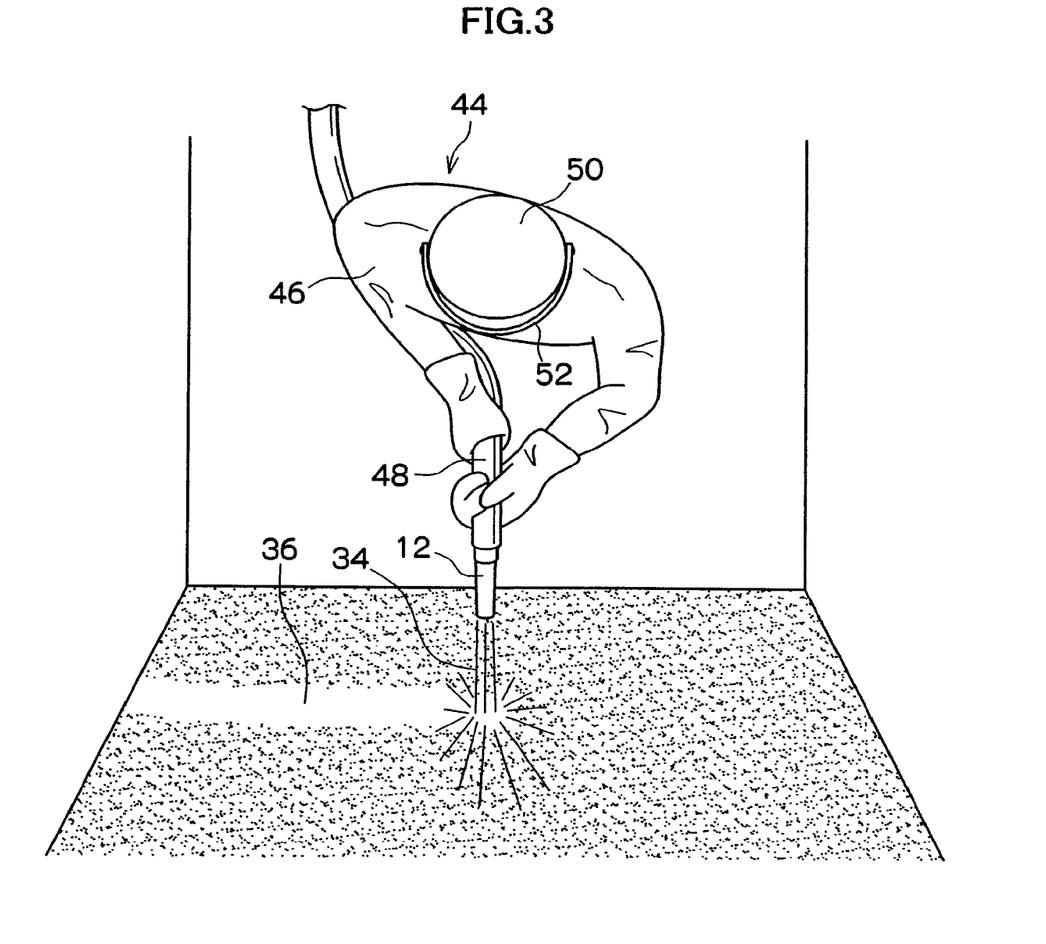
FIG. 3 illustrates the protective clothing of the operator of sponge blasting.

Therefore, the protective wear 46 of the operator 44 who handles the sponge blasting apparatus 10 need not be so heavy either, as shown in FIG. 3. FIG. 3 shows a state in which the operator 44 handling the sponge blasting apparatus 10 is holding a hose 48 near the nozzle 12 by both hands, and jetting the blasting medium 34 toward the work 36. This operator 44 need not wear a protector which covers all his body as he would in sand blasting. Nor is his helmet 50 a full-face type covering all his head and face, but an ordinary one used in any working site, a helmet fitted with a face protector 52 made of a transparent acryl plate, resulting in a very light protective wear 46. As this configuration serves to reduce the weight of the protective wear, the workload on the operator 44 can be significantly lessened.

Figure 4:
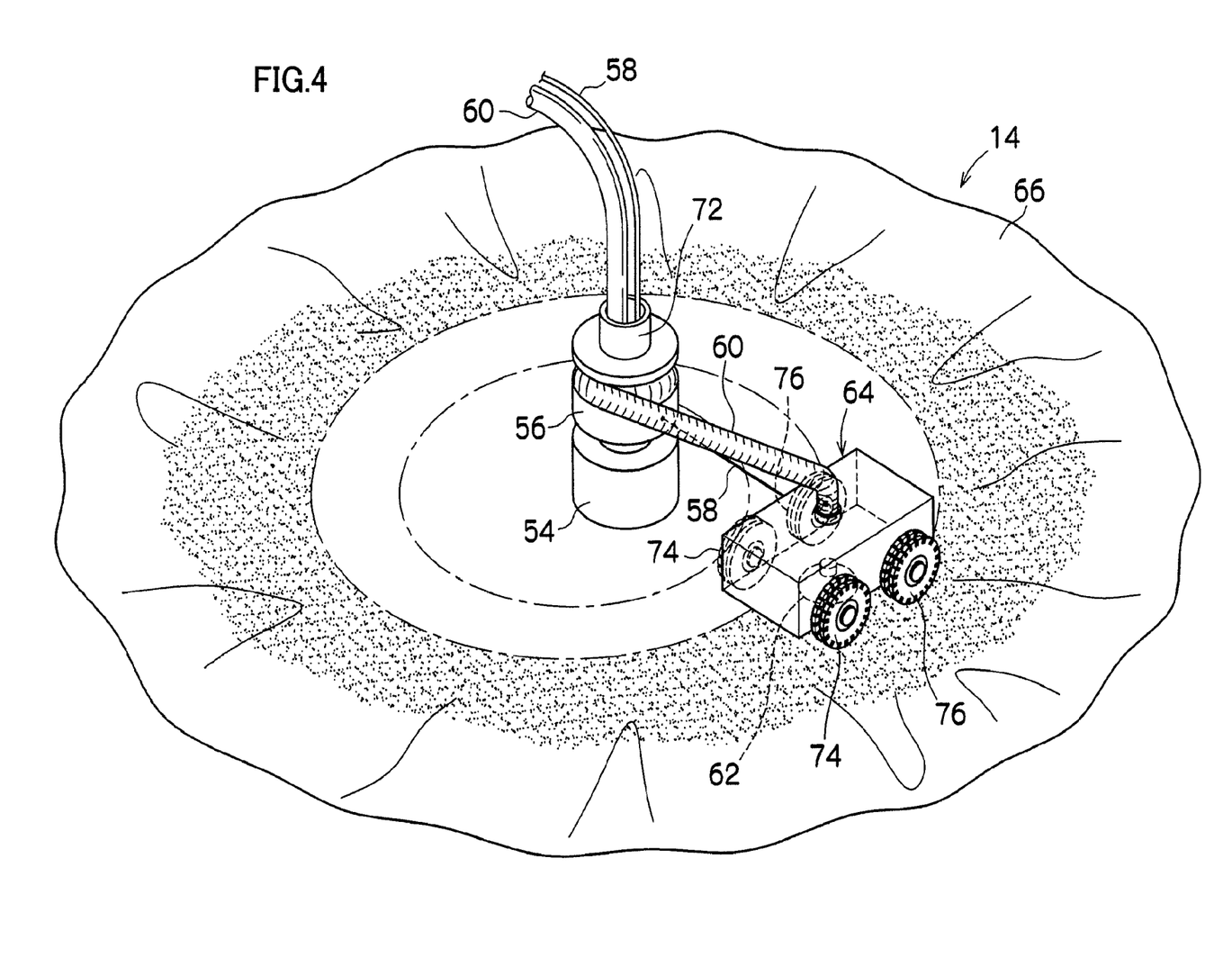
FIG. 4 shows a perspective view of a self-propelled recovering device applied to the sponge blasting apparatus of FIG. 1.
Figure 5:
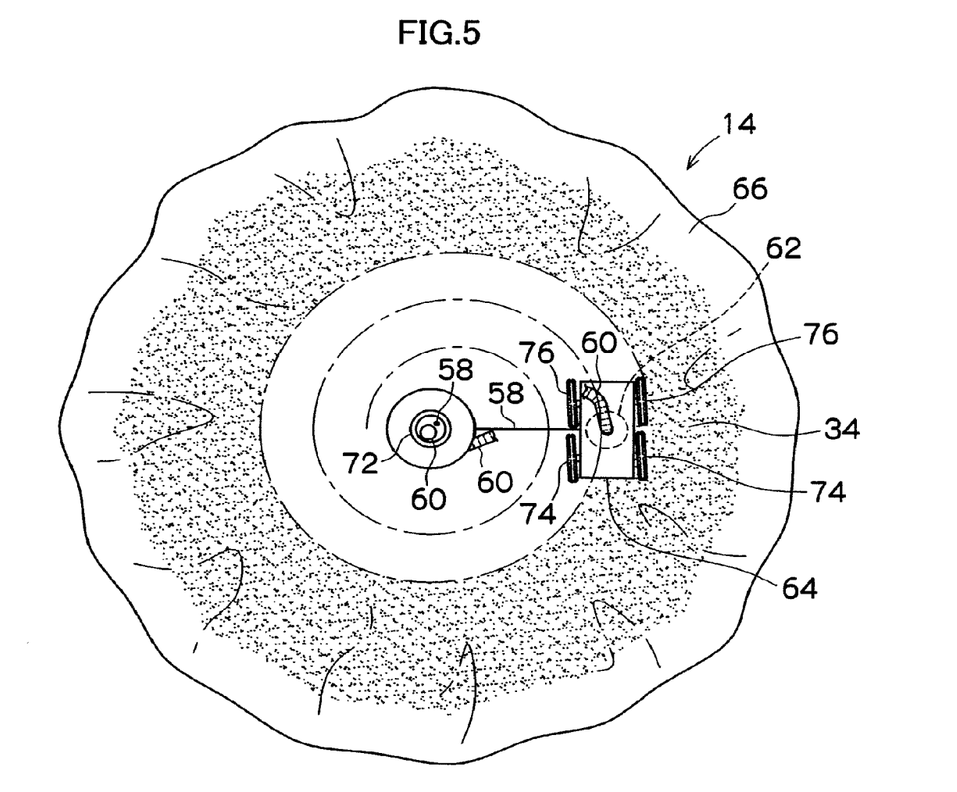
FIG. 5 shows a plan view of the self-propelled recovering device shown in FIG. 4.
Figure 6:
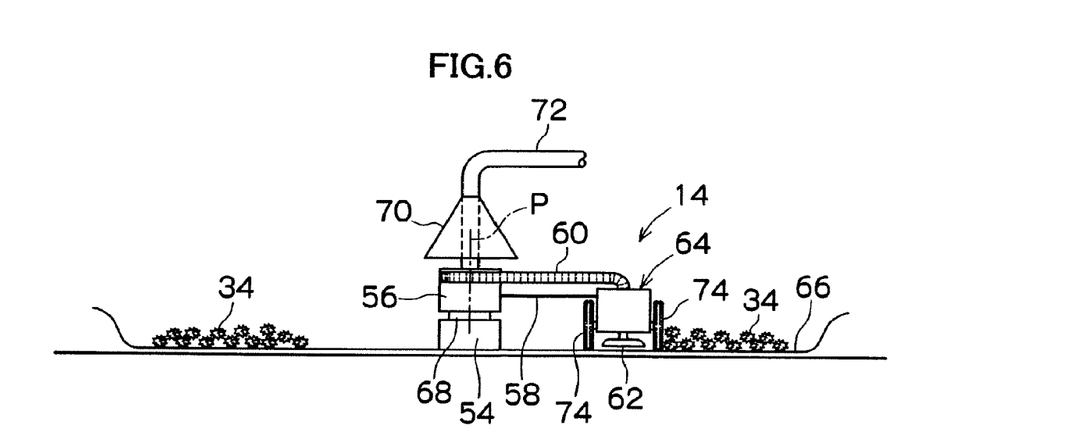
FIG. 6 shows a profile of the self-propelled recovering device shown in FIG. 4.

FIG. 4 shows an enlarged perspective view of the self-propelled recovering device 14 shown in FIG. 1. This self-propelled recovering device 14 comprises a center base 54, a rotating body 56 having the function of a reel, a power supply cable 58 functioning as a traction member, the sucking hose 60 of the blasting medium 34, and a sucking vehicle 64 provided with a suction port 62 as shown in FIG. 4 through FIG. 6.

The center base 54 is installed by its own weight in a prescribed position on a sheet 66 on which the blasting medium 34 falls. Also, the center base 54 has, built into it, a motor (not shown) and a battery which supplies power to this motor. The rotation shaft 68 (see FIG. 6) of the motor protrudes out of the upper part of the center base 54, and the rotating body 56 is fixed to that upper part. Therefore, the rotating body 56 rotates driven at a prescribed rotational frequency by the driving force of the motor built into the center base 54.

Incidentally, the center base 54 and the rotating body 56 are disposed on the sheet 66 before the blasting medium 34 is jetted out. In this case, to prevent the falling blasting medium 34 from accumulating on the center base 54 and the rotating body 56, an umbrella member 70 is fitted above the rotating body 56 as shown in FIG. 6. This umbrella member 70 is fixed to a pipe 72 arranged from above the rotating body 56 via a bearing (not shown). Further, the power supply cable 58 and the sucking hose 60 are inserted into the pipe 72, and this enables the power supply cable 58 and the sucking hose 60 to be arranged from outside in the sucking vehicle 64 via the rotating body 56.

On the other hand, a reeling device (not shown), which winds up or down the power supply cable 58 and the sucking hose 60 arranged from the rotating body 56 to the sucking vehicle 64 along with the self-rotation of the rotating body 56, is built into the rotating body 56. By interlocking this reeling device with the self-rotation of the rotating body 56, the sucking vehicle 64 linked to the power supply cable 58 and the sucking hose 60 is caused to travel in a substantially spiral way centering on the rotation shaft 68. This reeling device controls the winding up-and-down speed of the power supply cable 58 and the sucking hose 60 so that the sucking vehicle 64 shifts in the radial direction as much as the size of the suction port 62 (the diameter where the suction port is circular or the side length where it is rectangular) per turn of the rotating body 56. This enables the sheet 66 to thoroughly recover the blasting medium 34 that has fallen.

The suction port 62 provided in the sucking vehicle 64 is arranged in the bottom between the front wheels 74 and 74 and the rear wheels 76 and 76 of the four-wheel-drive sucking vehicle 64. Incidentally, the number of the suction port 62 is not limited to one, but a plurality of them may as well be disposed in the bottom of the sucking vehicle 64.

As shown in FIG. 1, the solid-gas separating tank 16 comprises a sucking unit 80 linked to the sucking hose 60 of the self-propelled recovering device 14; a vertically rising pipe 84 connecting the sucking unit 80 and the tank body 82 and arranged in the vertical direction; an urethane-lined plate 86 arranged opposite the upper outlet of the vertically rising pipe 84; a sieve 88 on which the blasting medium 34 falls, reduced in speed by collision with the urethane-lined plate 86, and which sorts by vibration that blasting medium into a reusable part and an unreusable part; a take-out device 90 for the reusable blasting medium 34 sorted by the sieve 88; and a take-out device 92 for the unreusable blasting medium 34.

The used blasting medium 34 sucked via the sucking hose 60 is introduced into the sucking unit 80, which serves as the inlet to the solid-gas separating tank 16, and dust of relatively large grain size sucked together with the blasting medium 34 is separated by a mesh or a sieve (neither shown) built into the sucking unit 80. The part of the blasting medium 34 having passed the mesh or the sieve is reduced in speed by being raised in the vertically rising pipe 84 by the sucking force (e.g. −47 kPa, 30 m$^3$/min, 30 kW) of the blower 18, and jetted upward through the outlet of the vertically rising pipe 84. This causes the blasting medium 34 to further lose speed by colliding with the urethane-lined plate 86, and to be inputted to a large-volume solid-gas separating chamber 94 of the tank body 82. Herein, the blasting medium 34 slows down to or beyond its final speed to become free to fall, and falls into the sieve 88 disposed in the solid-gas separating chamber 94.

The sieve 88 is inclined to the optimal angle according to the relevant conditions including the type of the blasting medium 34 and the sucking force of the blower 18. Further, a pressurized air-driven vibrator 96 is fitted in the substantially central part of the under face of the sieve 88, and the vibrator 96 vibrates the whole sieve 88. Therefore, the unreusable blasting medium 34 out of the blasting medium 34 having fallen on the sieve 88 is caused to pass the sieve 88 by its vibration, and falls into and deposited in a hopper-shaped reservoir 98 formed underneath the sieve 88. By the driving of a rotary feeder 100 linked to the hopper-shaped reservoir 98, the unreusable blasting medium is discharged into a trash box 102.

On the other hand, the reusable blasting medium 34 out of the blasting medium 34 having fallen on the sieve 88 does not pass but descends along the vibrating sieve 88, slides into a hopper-shaped reservoir 104 disposed downstream from the tank body 82 and is stored there.

As the blasting medium 34 accumulated in the hopper-shaped reservoir 104 is coagulated into a lump state by its own humidity, it cannot be supplied to the continuous feeding device 26 as it is. For this reason, in this embodiment of the invention, it is dropped into a picking-apart device 106 constituting the take-out device 90, where it is picked apart into fine pieces. The fine pieces of the blasting medium 34 picked apart by the picking-apart device 106 are supplied to a positive-pressure feed pipe 110 via a double damper 108, and pneumatically carried to the continuous feeding device 26 by the compressed air from the blower 28 linked to the positive-pressure feed pipe 110.

Figure 7:
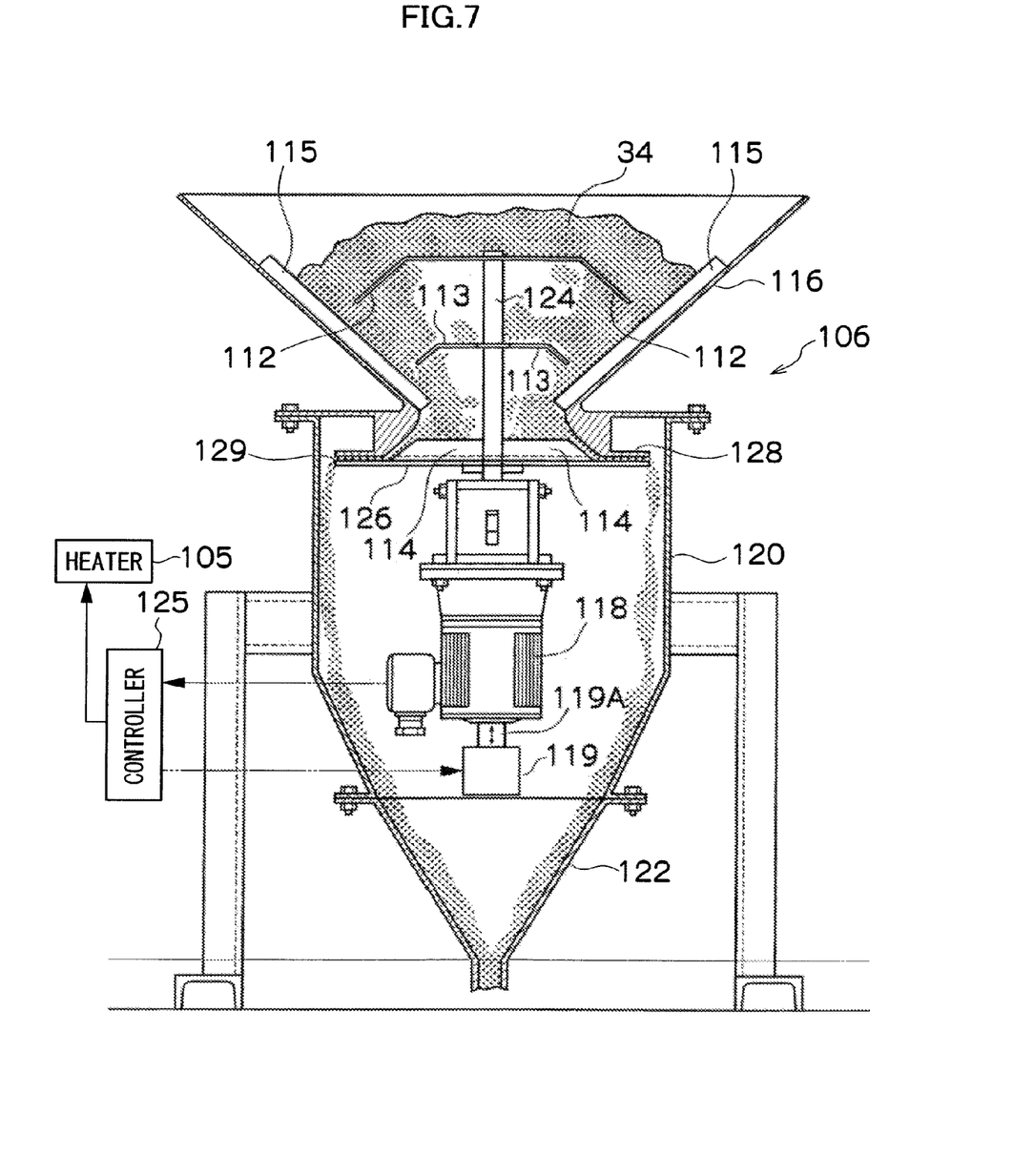
FIG. 7 shows a longitudinal section of a picking-apart device applied to the sponge blasting apparatus of FIG. 1.

FIG. 7 shows a longitudinal section of by the picking-apart device 106 of the present embodiment. This picking-apart device 106 picks apart into fine pieces each lump of the blasting medium 34, accumulated and coagulated into a lump state in the hopper-shaped reservoir 104, by applying shearing forces with upper and lower blades 112 and 113 shown in FIG. 8, shearing plates (first shearing plates) 115 and next shearing plates (second shearing plates) 114.

This picking-apart device 106 is linked to the hopper-shaped reservoir 104, and comprises an upper hopper 116 (container) through whose top inlet the blasting medium 34 in a coagulated state falls; a cylindrical body part 120 linked to the bottom of the upper hopper 116 and equipped with a blade turning motor (rotary drive unit) 118 and an air spring type actuator (gap adjuster) 119; and a lower hopper 122 linked to the bottom of the body part 120 and linked at its bottom to the double damper 108. The inner circumferential face of the upper hopper 116 is formed at an angle not narrower than the angle of repose, and the plurality of shearing plates 115, 115 . . . are fixed to this inner circumferential face.

The blade turning motor 118 is fixed to the movable part 119A of the air spring type actuator 119 fixed to the body part 120. Four blades 112, 112 . . . are fixed to the upper end of the spindle (rotation shaft) 124 of the blade turning motor 118; four blades 113, 113 . . . are fixed to the middle stage of the spindle 124; and a disk (rotary plate) 126 is fixed to the lower end of the spindle 124, with the four L-shaped shearing plates 114, 114 . . . being fixed onto this disk 126.

Figure 8:
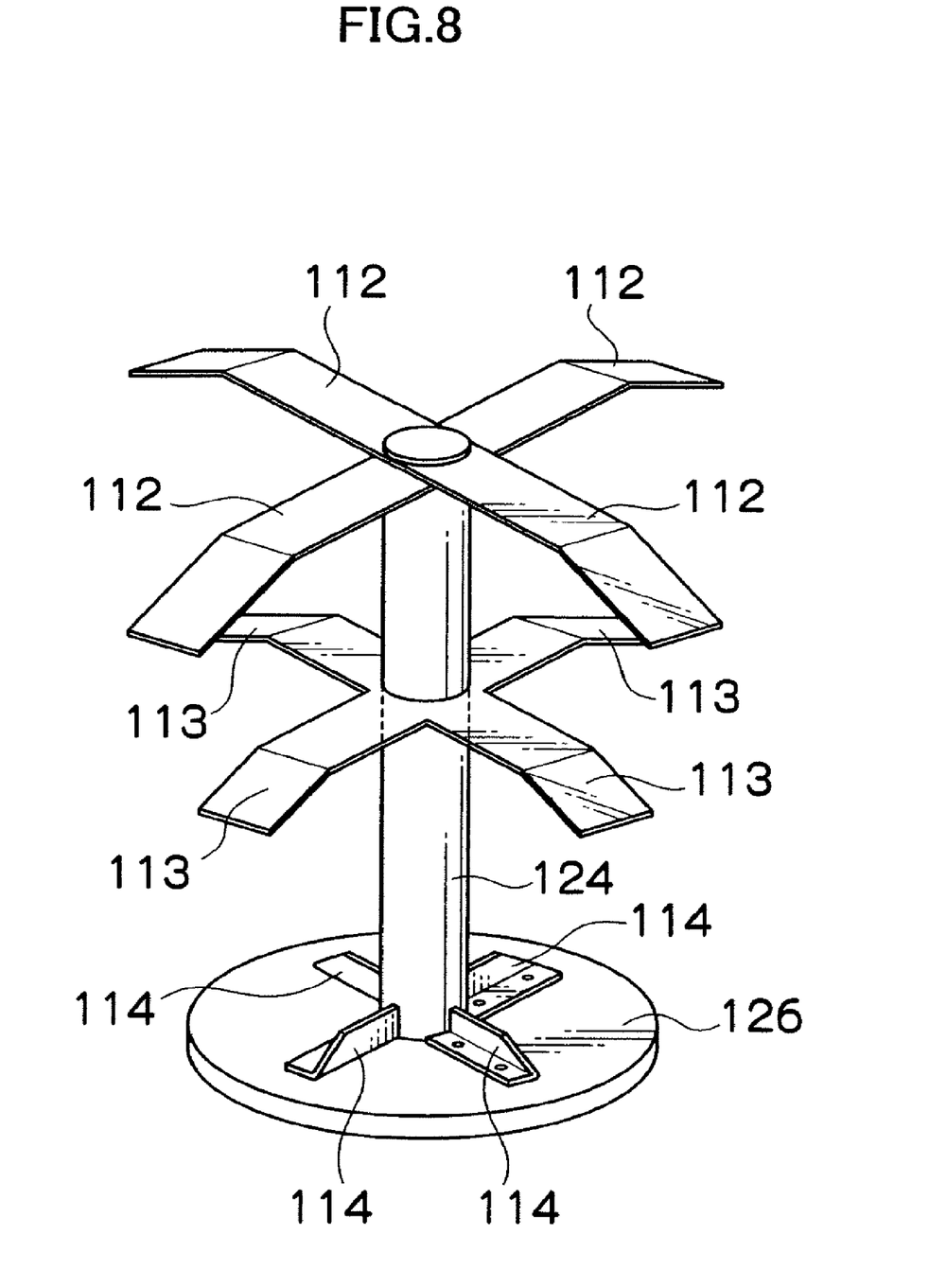
FIG. 8 shows a perspective view of the blade configuration of the picking-apart device shown in FIG. 7.

Therefore, in the picking-apart device 106 configured as described above, when the blades 112 and 113 and the shearing plates 114 are turned at about 50 rpm by the blade turning motor 118, a lump of the blasting medium 34, whose sides measure 100 to 200 mm for instance, having fallen onto the upper hopper 116, is roughly crushed into pieces of 30 to 50 mm in diameter by the shearing force generated between the turning of the blades 112 and 113 and the shearing plates 115.

The lumps into which the blasting medium 34 has been roughly crushed fall onto the rotating disk 126 through the bottom outlet of the upper hopper 116, and sent out toward the outer circumference of the disk 126 by the centrifugal force of the disk 126.

Now, the lumped blasting medium 34 is separated into fine pieces by the shearing force of the rotating shearing plates 114, and pressed into a narrow gap 129 between an annual flange (horizontal board) 128 arranged at the bottom outlet of the upper hopper 116 and the disk 126, where each lump of the blasting medium 34 is picked apart into fine pieces.

The resultant pieces of the blasting medium 34 fall from the gap, and are fed to the double damper 108 via the lower hopper 122. In this way, the lumped blasting medium 34 is prevented from being fed to the continuous feeding device 26, which instead is supplied with finely separated pieces of each lump of the blasting medium 34, with the result that the positive-pressure feed pipe 110, the continuous feeding device 26 and the nozzle 12 are prevented from being clogged with the blasting medium 34.

The amperage of the blade turning motor 118 is detected by a controller 125, and the controller 125 has an arithmetic unit to compute any variation in that amperage into a torque variation of the spindle 124. The controller 125, in which a torque (a certain range of torques) of the spindle corresponding to the torque by which the blasting medium is picked apart is stored, controls the air spring type actuator 119 so as to keep the computed (detected) torque within that range, adjusts the height-wise position of the disk 126 relative to the flange 128, and regulates the gap 129 to 8 mm for instance. Thus, if the computed torque does not surpass the aforementioned torque range, the gap 129 is narrowed to enhance the picking-apart effect. Or if the computed torque surpasses that torque range, the gap 129 is widened to return to the aforementioned torque range. If the detected torque markedly surpasses that torque range, it is interpreted as meaning that the gap 129 is clogged, and the operation of the blade turning motor 118 is stopped.

Furthermore, if the computed torque tends to gradually increase, the controller 125 drives a heater 105 fitted to the hopper-shaped reservoir 104 shown in FIG. 1 to heat the solidified blasting medium 34 through the hopper-shaped reservoir 104 and evaporate the moisture of the blasting medium 34. Since the blasting medium 34 is in a hygroscopic sponge form, the progress of solidification can be prevented by evaporating the moisture of the blasting medium 34.

Within a range not below a certain level (where picking apart requires a considerable force), control is exercised in the direction of increasing the torque on the basis of the amperage of the blade turning motor 118, and in a range not below another level, the operation is controlled within a normal amperage range.

Incidentally, the number of stages of blades and the number of the blades 112 and 113 are not limited to two and four each respectively, but there may be three or more stages and/or five or more blades. The gap between the blades 112 and 113 can be appropriately set to match the type of the blasting medium 34 or any other relevant factor. They can pick apart a blasting medium of any form into fine fragments.

The fine fragments into which the blasting medium 34 has been picked apart by the picking-apart device 106 are supplied to the positive-pressure feed pipe 110 via the double damper 108, and pneumatically fed toward the continuous feeding device 26 by the compressed air from the blower 28 linked to this positive-pressure feed pipe 110.

The double damper 108 is intended for interception between the solid-gas separating tank 16 set to a negative pressure and the positive-pressure feed pipe 110, and has an upper damper 130 and a lower damper 132.

Although these dampers 130 and 132 are usually held in a closed state, when the picking-apart device 106 is driven and fine fragments of the blasting medium 34 accumulate in a prescribed quantity in the damper 130, the damper 130 is opened. This causes the pieces of the blasting medium 34 to fall and accumulate on the damper 132. After that, when the damper 130 is closed and the damper 132 is opened, pieces of the blasting medium 34 fall on the positive-pressure feed pipe 110 and the fallen pieces of the blasting medium 34 are pneumatically fed toward the continuous feeding device 26 by the compressed air from the blower 28. At the time when all the pieces of the blasting medium 34 on the damper 132 have fallen on the positive-pressure feed pipe 110, the damper 132 is closed. By repeating this sequence, the reusable picked-apart pieces of the blasting medium 34 can be supplied to the continuous feeding device 26.

Reusable pieces of the blasting medium 34 can be prevented from being damaged by using the double damper 108 as the feeding device as stated above. For unreusable pieces of the blasting medium 34, since they may be destroyed, the rotary feeder 100 is used as shown in FIG. 1.

Incidentally, some of the pieces of the blasting medium 34 having fallen from the picking-apart device 106 are delivered into a particle size measuring unit 135 by the opening of a valve 133.

The particle size measuring unit 135 may comprise, for instance, an X-ray irradiator for irradiating the blasting medium 34 with X-rays, a particle size gauge for determining the particle size of abrasives 30 stuck to the blasting medium by subjecting the X-ray transmitting image to three-dimensional processing, and a controller for determining whether a given part of the blasting medium is reusable or unreusable according to the particle size determined by the particle size gauge.

Figure 9:
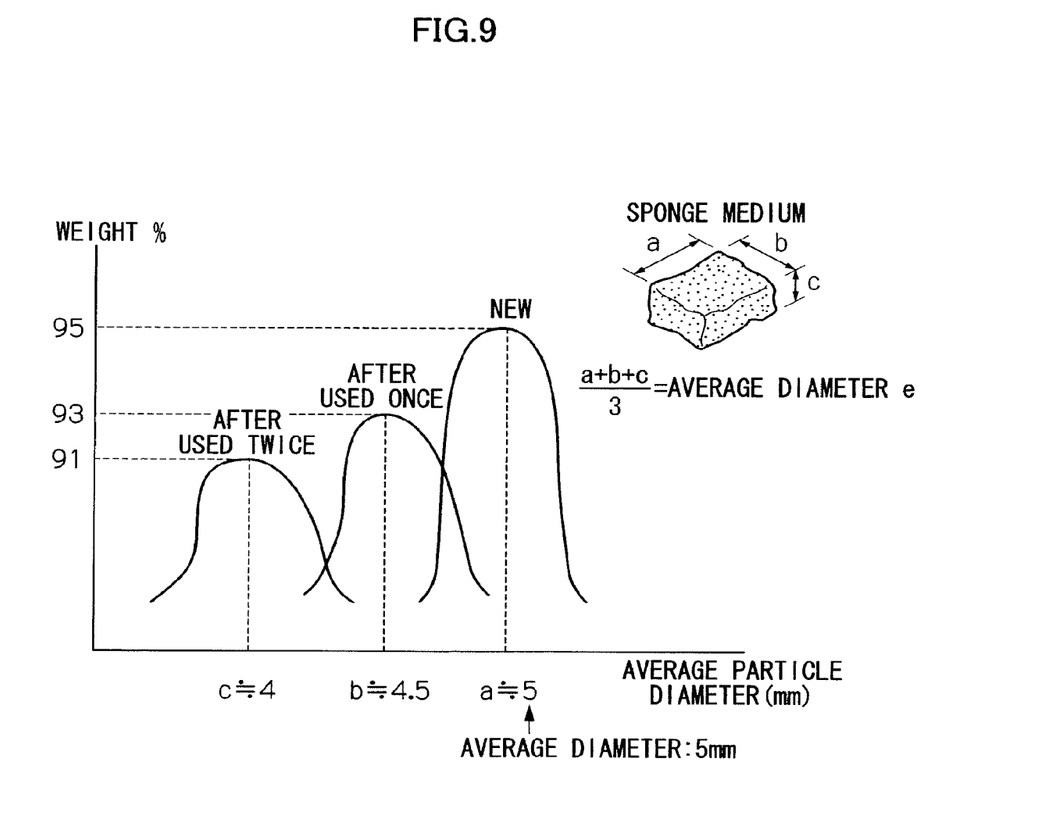
FIG. 9 illustrates the particle size distribution of abrasives in the blasting medium.

The controller prepares a particle size distribution shown in FIG. 9 on the basis of the measured particle sizes, and its memory stores a particle size threshold (the limit of usable particle size) according to which a given part of the blasting medium is reusable or unreusable. Also, the controller compares the peak level of the particle size distribution prepared and the limit of usable particle size and, when the peak level reaches or falls below the limit of usable particle size, exercises control to cause an alarm lamp (display unit) to be lit. Incidentally, the part of the blasting medium 34 determined to be reusable by the particle size measuring unit 135 is supplied to the positive-pressure feed pipe 110 via a double damper (not shown).

Next, a method of evaluating the remaining functional life of the blasting medium 34 by using the particle size measuring unit 135 will be described.

Part of the blasting medium 34 sorted as reusable by the sieve 88 during the operation of the sponge blasting apparatus 10 is recovered from the picking-apart device 106. Then, the average projected diameter of the blasting medium 34 is measured with the particle size measuring unit 135 to prepare the particle size distribution shown in FIG. 9.

FIG. 9 shows diagrams of particle size distribution of the abrasives 30 of a new blasting medium 34, that of a medium after being used once, and that of a medium after being used twice. According to this graph, the peak value of the average particle size (e:e=(a+b+c)/3) of the particle size distribution of a new blasting medium 34 is a, and that of a medium after being used once is b. Then, since the relationships of this b to the usable limit diameter D (about 2.8 mm) is b>D, the blasting medium 34 of that lot is determined to be reusable and supplied to the positive-pressure feed pipe 110.

Then, the blasting medium 34 used for the second grinding is fed again to the particle size measuring unit 135 to undergo particle size measuring and to prepare a particle size distribution on that basis. The particle size distribution then prepared is that shown in FIG. 9 as the medium having been used twice. As the peak value of the particle size distribution shown in this graph is c, whose the relationships to the usable limit diameter D is c>D, the blasting medium 34 of that lot is determined to be reusable and supplied to the positive-pressure feed pipe 110. Then it is used for the third time and the fourth time and, when the peak value of the particle size distribution after its use for a prescribed number of times is found less than D, the blasting medium 34 of that lot is determined to be unreusable. As this causes the alarm lamp (display unit) to be lit, the operator 44 can know that the blasting medium 34 of that lot has reached the end of its useful lime, and discards that blasting medium 34, even if it has been sorted as reusable by the sieve 88 to replace it with a new blasting medium 34.

This makes possible automatic determination of the remaining functional life of a blasting medium 34 wherein abrasives 30 are stuck within sponge fragments 32.

Incidentally, remaining functional life assessing methods for the blasting medium 34 include one based on the unit-volume mass of the blasting medium 34 and another based on the projected area of the blasting medium 34. The apparatus has a controller which measures that unit-volume mass or the projected area of the blasting medium, and stops blast operation when either has gone beyond a certain range of values.

On the other hand, as shown in FIG. 1, the exhaust air discharged from the solid-gas separating tank 16 with the sucking force of the blower 18 is introduced into the bag filter 20 via a duct 134. As the discarded air passes filters 136 and 136 of the bag filter 20, it is cleared of the fine dust of the blasting medium and other kinds of dust contained in the exhaust air and discharged into the atmosphere. Therefore, the working environment is significantly improved. Incidentally, the dust stuck to the filters 136 and 136 are removed from them by back-washing the filters 136 and 136 and fall into a lower hopper 138. By opening the lid 140 of the lower hopper 138, the dust can be discarded from the bag filter 20.

Incidentally, the blasting medium 34 pneumatically carried to the positive-pressure feed pipe 110 is put into a cyclone separator 142 disposed on the upstream side of the continuous feeding device 26, and separated from air by this separator.

The blasting medium 34 separated from air falls into a damper 146 disposed in the lower hopper 144 of the cyclone separator 142. When a prescribed quantity of pieces of the blasting medium 34 on the damper 148 has accumulated on the damper 146, the damper 146 is opened in accordance with information from a level sensor (not shown). This causes the blasting medium 34 to fall onto a damper disposed underneath the damper 146 and accumulates there. After that, the damper 146 is closed, and communication between the cyclone separator 142 and the continuous feeding device 26 is cut off. When the damper 148 is opened after this, the blasting medium 34 falls onto the continuous feeding device 26. At the time, when the whole blasting medium 34 on the damper has fallen onto the continuous feeding device 26, the damper 148 is closed. By repeating this sequence, the blasting medium 34 is supplied from the cyclone separator 142 to the continuous feeding device 26.

The continuous feeding device 26 comprises the two reservoir tanks 22 and 24 to which the blasting medium 34 is inputted from the cyclone separator 142; a change-over valve 147 for so guiding the blasting medium 34 from the cyclone separator 142 as to enter into the tank 22 (or 24) out of the two tanks 22 and 24, and a blower 149 for continuously supplying the nozzle 12 with the blasting medium 34 from that tank 22 (or 24) by switching over the two tanks 22 and 24 between each other.

Next, the actions of the sponge blasting apparatus 10 configured as described above will be described.

First, this sponge blasting apparatus 10 is configured by linking in series the self-propelled recovering device 14, the solid-gas separating tank 16, the bag filter 20 and the blower 18 as shown in FIG. 1. Therefore in this sponge blasting apparatus 10, the sucking force of the blower 18 is transmitted from the bag filter 20 to the self-propelled recovering device 14 via the solid-gas separating tank 16, and causes the self-propelled recovering device 14 to recover the blasting medium 34.

This recovered blasting medium 34 is sorted by the solid-gas separating tank 16 into a reusable blasting medium 34 and an unreusable blasting medium 34. The reusable blasting medium 34 is taken out of the solid-gas separating tank 16, carried by the blower 28 to the continuous feeding device 26.

The continuous feeding device 26 has the two reservoir tanks 22 and 24 to which the reusable blasting medium 34 is to be inputted and, when the blasting medium 34 stored in the first tank 22 is supplied to the nozzle 12, the reusable blasting medium is carried to the second tank 24. When the first tank 22 becomes empty, the blasting medium stored in the second tank 24 is supplied to the nozzle 12. The switching-over between these tanks 22 and 24 is automatically accomplished by controlling the change-over valve 147 according to the output of level sensors (not shown) which detects the quantities of the blasting medium in the tanks 22 and 24. Therefore, the sponge blasting apparatus 10 of this embodiment of the invention can continuously supply a reusable blasting medium to the nozzle.

Incidentally, though the sponge blasting apparatus 10 of the embodiment shown in FIG. 1 has three blowers 18, 28 and 149, it is more preferable for a single blower to serve the purposes of all of them.

Further in the configuration shown in FIG. 1, the reusable blasting medium 34 is supplied to the positive-pressure feed pipe 110 via the double damper 108, this is not the only possible configuration.

Figure 10:
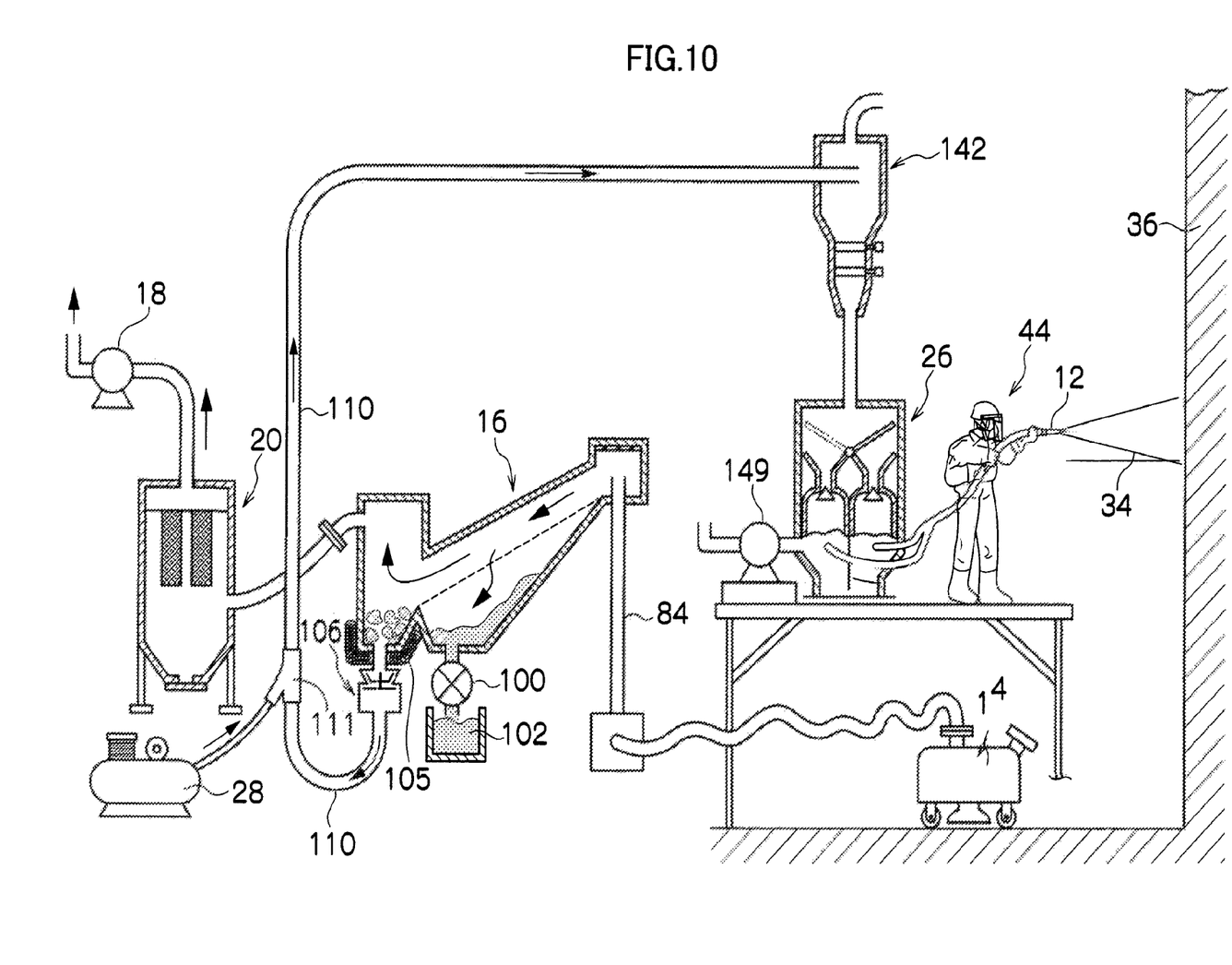
FIG. 10 shows an overall configuration of a sponge blasting apparatus, which is another embodiment of the invention.

For instance, as shown in FIG. 10, the positive-pressure feed pipe 10 may be directly linked to the outlet portion of the picking-apart device 106, the blower 28 may be linked to the positive-pressure feed pipe 110 via an ejector 111, and the ejector effect derived from the compressed air from the blower 28 may be utilized to carry the blasting medium 34 falling from the picking-apart device 106 to the continuous feeding device 26.

What is claimed is:

1. A sponge blasting apparatus which jets against a work a blasting medium of a sponge fragment formed of abrasives stuck within a porous elastic body out of a nozzle and grinds the work, comprising:
   a recovering unit which sucks and recovers the blasting medium jetted out of the nozzle;
   a sorting unit which sorts the blasting medium sucked and recovered by the recovering unit into a reusable blasting medium and an unreusable blasting medium;
   a blower which gives a sucking force to the recovering unit via the sorting unit;
   a dust collector which removes dust from an exhaust air discharged from the sorting unit with a sucking force of the blower;
   a picking-apart unit which picks apart the reusable blasting medium sorted by the sorting unit;
   a continuous feeder which, having at least two reservoir tanks into which the reusable blasting medium picked apart by the picking-apart unit is inputted, changes over the two tanks between each other to continuously feed the nozzle with the blasting medium deposited in the tanks; and
   a carrier which carries to the continuous feeder the reusable blasting medium sorted by the sorting unit;

wherein the picking-apart unit includes:
- a rotary vane which picks apart by being rotated the reusable blasting medium having solidified into a lump state;
- a heater which heats the reusable blasting medium having solidified into a lump state in a hopper-shaped reservoir disposed upstream from the rotary vane; and
- a controller which drives the heater when the rotary torque of the rotary vane reaches or surpasses a certain level.

2. A sponge blasting apparatus which jets against a work a blasting medium of a sponge fragment formed of abrasives stuck within a porous elastic body out of a nozzle and grinds the work, comprising:
- a recovering unit which sucks and recovers the blasting medium jetted out of the nozzle;
- a sorting unit which sorts the blasting medium sucked and recovered by the recovering unit into a reusable blasting medium and an unreusable blasting medium;
- a blower which gives a sucking force to the recovering unit via the sorting unit;
- a dust collector which removes dust from an exhaust air discharged from the sorting unit with a sucking force of the blower;
- a picking-apart unit which picks apart the reusable blasting medium sorted by the sorting unit;
- a continuous feeder which, having at least two reservoir tanks into which the reusable blasting medium picked apart by the picking-apart unit is inputted, changes over the two tanks between each other to continuously feed the nozzle with the blasting medium deposited in the tanks; and
- a carrier which carries to the continuous feeder the reusable blasting medium sorted by the sorting unit;
- a particle size measuring unit which measures a particle size of the blasting medium picked apart by the picking-apart unit; and
- a controller which prepares a particle size distribution on the basis of particle sizes measured by the particle size measuring unit, wherein
the controller compares a threshold for judging whether a blasting medium is reusable or reusable with a peak level of the particle size distribution prepared and, when the peak level surpasses the threshold, causes a display unit to display the usable limit of the medium.

3. The sponge blasting apparatus according to claim 1, further comprising:
- a particle size measuring unit which measures a particle size of the blasting medium picked apart by the picking-apart unit; and
- a controller which prepares a particle size distribution on the basis of particle sizes measured by the particle size measuring unit, wherein
the controller compares a threshold for judging whether a blasting medium is reusable or reusable with a peak level of the particle size distribution prepared and, when the peak level surpasses the threshold, causes a display unit to display the usable limit of the medium.

4. A sponge blasting method which uses the sponge blasting apparatus according to claim 1, to jet against a work a blasting medium of a sponge fragment formed of abrasives stuck within a porous elastic body out of a nozzle and to grind the work.

5. A sponge blasting method which uses the sponge blasting apparatus according to claim 2 to jet against a work a blasting medium of a sponge fragment formed of abrasives stuck within a porous elastic body out of a nozzle and to grind the work.

6. A sponge blasting method which uses the sponge blasting apparatus according to claim 3 to jet against a work a blasting medium of a sponge fragment formed of abrasives stuck within a porous elastic body out of a nozzle and to grind the work.

* * * * *